Aug. 20, 1935.  B. H. CANADY ET AL  2,011,674
PISTON CONSTRUCTION AND RING
Filed May 25, 1934
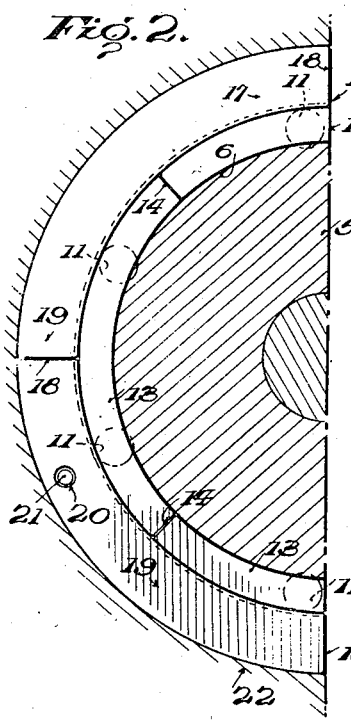
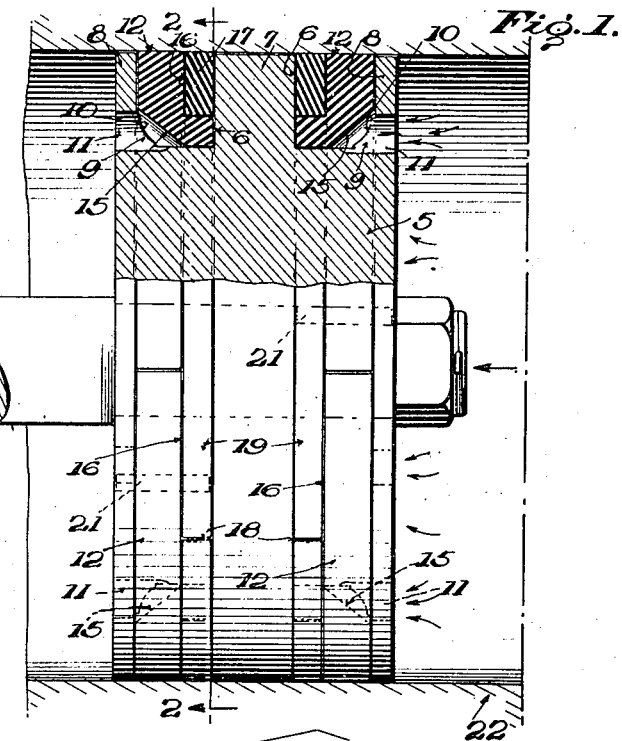
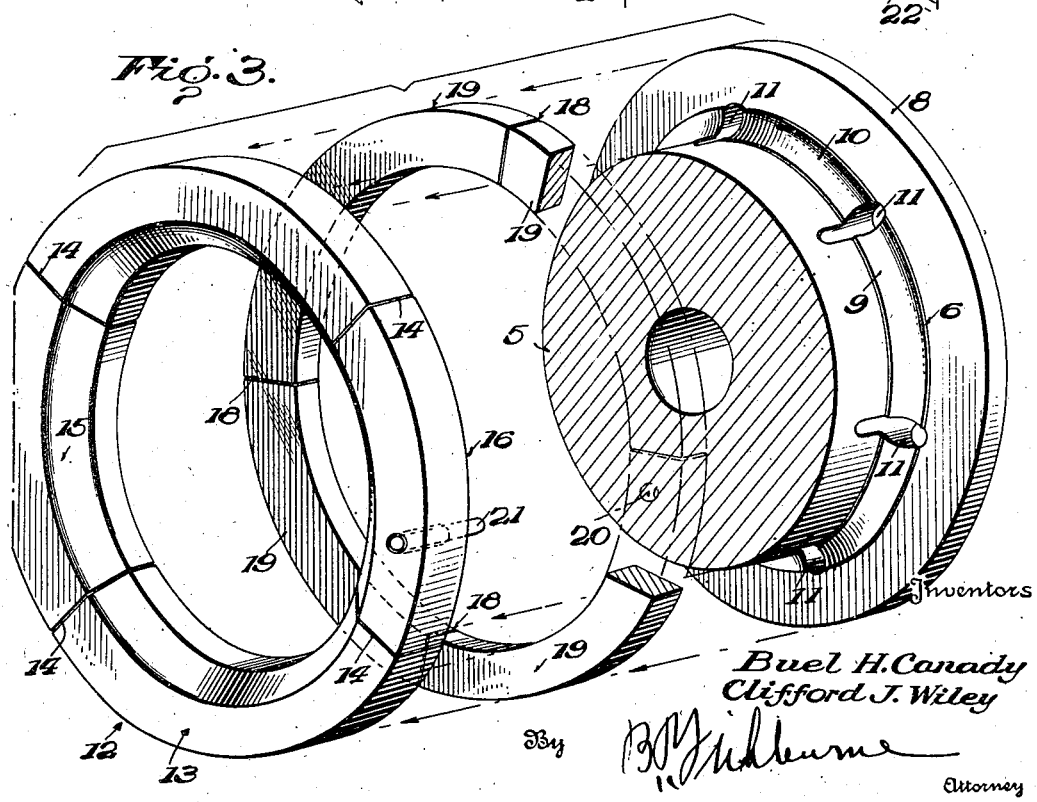
Inventors
Buel H. Canady
Clifford J. Wiley
By
Attorney Patented Aug. 20, 1935

2,011,674

UNITED STATES PATENT OFFICE 2,011,674

PISTON CONSTRUCTION AND RING

Buel H. Canady and Clifford J. Wiley, Winslow, Ariz.

Application May 25, 1934, Serial No. 727,531

2 Claims. (Cl. 309—31)

Our invention relates to a packing ring device for use upon a sliding body.

An important object of the invention is to provide a packing ring device of the above mentioned character, which will be automatically expanded by the increase in pressure within the cylinder, for producing a gas tight joint and will automatically contract upon the reduction of such pressure, to break such gas tight joint.

A further object of the invention is to provide a packing ring device of the above mentioned character, so constructed that under pressure it will be seated upon the end wall of the groove containing it and also upon the inner surface of the cylinder.

A further object of the invention is to provide a piston and piston ring, so constructed that the piston ring is self-adjusting, with the variance of pressure within the cylinder.

A further object of the invention is to provide a piston and piston ring, so constructed that a proper gas tight joint may be effected between the piston and cylinder, when the piston is travelling in opposite directions under pressure.

Other objects and advantages will be apparent during the course of the following description.

In the accompanying drawing forming a part of this application and in which like numerals are employed to designate like parts throughout the same, Figure 1 is a side elevation of a device embodying our invention, parts being shown in central vertical longitudinal section, Figure 2 is a transverse section taken on line 2—2 of Figure 1, parts omitted, and, Figure 3 is a perspective view of the elements included in the invention, parts broken away, and parts omitted.

In the drawing wherein for the purpose of illustration is shown a preferred embodiment of our invention, the numeral 5 designates a sliding body, which may be in the form of a sliding piston body or sliding valve body. This sliding body is cylindrical and is provided upon its periphery and near its opposite ends with annular grooves 6 for receiving ring devices. These grooves are separated by an annular flange 7, as shown. There are also annular flanges 8 formed by the grooves and which are included in the ends of the sliding body. The peripheries of the flanges 7 and 8 constitute the periphery of the sliding body, and the sliding body rides on these flanges in operation. The side walls of the flange 7 are parallel and are disposed at a right angle to the central longitudinal axis of the sliding body. The inner side walls of the flanges 8 are parallel throughout the major portion of their width and are disposed at a right angle to the central longitudinal axis of the sliding body 5. At the union of the flanges 8 with the sliding body 5, the material is thickened, forming a reinforcing portion 9, having an inner inclined wall 10. Pressure supply openings 11 are formed in the ends of the sliding body 5 and pass through the flanges 8 and reinforcing portions 9 and lead into the grooves 6, near their inner closed ends.

Arranged within each groove 6 is a packing ring device 12, including a master ring 13, which is formed of metal, such as brass, although other materials may be employed. This master packing ring is radially slit at a plurality of points, as shown at 14, to separate the master packing ring into a plurality of separate segments. While we have shown four of these segments, the invention is not restricted to any particular number, as any suitable number such as two or more may be used. However, the segments are entirely separate and are accordingly self-adjusting with relation to each other. This master ring is inserted within the grooves 6, and is provided at its corner located at the juncture of its outer side and inner periphery, with an oblique or beveled face 15. This face is disposed at an angle of 45° to the central longitudinal axis of the piston. The master ring is also provided upon its inner side with a recess 16, which is rectangular in cross-section, as shown. A sealing ring 17, formed of suitable material, such as brass or other metal, is mounted within the recess 16. This sealing ring is radially slit at a plurality of points, as shown at 18, for providing separate segments 19. While we have shown four of these separate segments 19, any suitable number, such as two or more may be used. The periphery of the master ring 12 and the sealing ring 17 are flush with each other. The slits or joints of the segments 19 are arranged to break joint with the slits or joints 14 of the segments 13, and in order that the segments of the sealing ring may not turn circumferentially with respect to the segments of the master ring, one segment 13 and one segment 19 are provided with openings 20, for receiving a dowel pin 21.

The operation of the combined sliding body and packing ring device is as follows:

The piston body or valve body may be regarded as operating within a cylinder 22, having fluid pressure, such as steam, alternatingly supplied to and exhausted from the opposite ends of the cylinder, as is the case with the ordinary steam engine. Assuming that the steam pressure has entered the right end of the cylinder, Figure 1, such steam pressure will be transmitted through the openings 11 and act upon the beveled face 15 of the master ring 13, to the right. Since this face is arranged at an incline of about 45° to the central longitudinal axis of the piston, the steam pressure acting upon this face will shift the master ring 13 forwardly to the left and also radially outwardly, which radial movement is also effected by the steam passing beneath the master ring 12, beyond the face 15. As a result of this, the peripheries of the master and sealing rings are forced into proper engagement with the inner wall of the cylinder, while the forward sides of the master ring and sealing ring are also forced into engagement with the adjacent side wall 6 of the inner flange 7. Two sealing engagements are therefore effected, for affording a gas tight contact. When the steam is exhausted from the right end of the cylinder and the piston is shifted to the right by virtue of steam under pressure being introduced into the left end of the cylinder, the ring device in the groove 6 to the left is expanded radially and also forced into engagement with the side wall 6 to the left, while the ring device to the right, being relieved of pressure, will contract. It is thus seen that the fluid pressure which is employed to move the sliding body shifts the ring device laterally and expands it radially. Further, the segments of the sealing ring may partake of restricted radial movements with respect to the segments of the master ring, particularly when parts wear, thereby affording a tighter fit with the inner wall of the cylinder. The piston may be reciprocating with the steam under pressure cut off from both sides of the cylinder, as when a railway locomotive is drifting. Both ring devices being therefore relieved of steam pressure, they will radially contract, therefore serving to some extent, to by-pass gases from one end of the cylinder to the other.

It is to be understood that the form of our invention herewith shown and described is to be taken as a preferred example of the same and that various changes in the shape, size and arrangement of parts may be resorted to, without departing from the spirit of our invention or the scope of the subjoined claims.

Having thus described our invention what we claim is:

1. A sliding body provided upon its periphery with a circumferential groove providing spaced flanges, one flange being an end flange and having its periphery constituting a portion of the periphery of the sliding body so that the sliding body rides upon the end flange in operation, said end flange having a reinforced portion at its base provided with an inner inclined face so that the reinforced portion increases in width radially inwardly, said reinforced portion having a port or ports therein, said port or ports being generally parallel with the bottom wall of the groove and having their radial outer portions disposed radially outwardly of said bottom wall, and a circumferentially expansible and contractible packing ring mounted within the groove and having an inclined face upon its corner next to the ports so that pressure acting upon this last named inclined face will urge the packing ring longitudinally and radially outwardly with relation to the sliding body.

2. A sliding body provided upon its periphery with spaced circumferential grooves providing an intermediate flange and end flanges, the end flanges having their peripheries constituting portions of the periphery of the sliding body so that the sliding body rides upon the end flanges in operation, the end flanges being integral with the sliding body and having reinforcing portions at their bases, said reinforcing portions having ports formed therein, said ports being generally parallel with the bottom walls of the grooves and having their radial outer portions disposed outwardly of said bottom walls, and a circumferentially expansible and contractible packing ring mounted within each groove and having an inclined face upon its corner next to the port or ports so that pressure acting upon this inclined face will urge the packing ring longitudinally and radially outwardly with relation to the sliding body.

BUEL H. CANADY.
CLIFFORD J. WILEY.